United States Patent
Nakayama et al.

(10) Patent No.: US 10,239,993 B2
(45) Date of Patent: Mar. 26, 2019

(54) BRANCHED POLYCARBONATE RESIN AND METHOD FOR PRODUCING SAME

(71) Applicant: IDEMITSU KOSAN CO., LTD., Tokyo (JP)

(72) Inventors: Yumi Nakayama, Kimitsu (JP); Koichi Suga, Sodegaura (JP); Yasuhiro Ishikawa, Ichihara (JP)

(73) Assignee: IDEMITSU KOSAN CO., LTD., Tokyo (JP)

( * ) Notice: Subject to any disclaimer, the term of this patent is extended or adjusted under 35 U.S.C. 154(b) by 0 days.

(21) Appl. No.: 15/522,217

(22) PCT Filed: Oct. 27, 2015

(86) PCT No.: PCT/JP2015/080295
§ 371 (c)(1),
(2) Date: Apr. 26, 2017

(87) PCT Pub. No.: WO2016/068154
PCT Pub. Date: May 6, 2016

(65) Prior Publication Data
US 2017/0321003 A1    Nov. 9, 2017

(30) Foreign Application Priority Data
Oct. 30, 2014    (JP) .................................. 2014-222083

(51) Int. Cl.
| | | |
|---|---|---|
| *C08G 64/08* | (2006.01) | |
| *C08G 64/14* | (2006.01) | |
| *C08G 64/24* | (2006.01) | |
| *C08G 77/448* | (2006.01) | |
| *C08L 69/00* | (2006.01) | |
| *C08L 101/00* | (2006.01) | |

(52) U.S. Cl.
CPC ........... *C08G 64/085* (2013.01); *C08G 64/14* (2013.01); *C08G 64/24* (2013.01); *C08G 77/448* (2013.01); *C08L 69/00* (2013.01); *C08L 101/00* (2013.01)

(58) Field of Classification Search
None
See application file for complete search history.

(56) References Cited

U.S. PATENT DOCUMENTS

| | | | |
|---|---|---|---|
| 3,410,820 A | 11/1968 | Harrod | |
| 3,752,699 A * | 8/1973 | Harrell | C08F 8/42 428/375 |
| 4,530,974 A * | 7/1985 | Munro | C08J 7/12 523/112 |
| 5,098,982 A * | 3/1992 | Long, II | C08G 18/683 521/56 |
| 2006/0194068 A1* | 8/2006 | Katoh | C08G 73/106 428/447 |
| 2007/0238846 A1 | 10/2007 | Davis et al. | |

FOREIGN PATENT DOCUMENTS

| | | |
|---|---|---|
| CN | 101307144 A | 11/2008 |
| CN | 102161819 A | 8/2011 |
| CN | 104119520 A | 10/2014 |
| JP | H03-200807 A | 9/1991 |
| JP | H06-256364 A | 9/1994 |
| JP | H09-136962 A | 5/1997 |
| JP | H11-060717 A | 3/1999 |
| JP | 2004-182853 A | 7/2004 |
| JP | 2005-126640 A | 5/2005 |
| JP | 2006-265243 A | 10/2006 |

OTHER PUBLICATIONS

Hiorns, A Brief Guide to Polymer Nomenclature, Pure Applied Chemistry vol. 84 No. 10 (2012) pp. 2167-2169. (Year: 2012).*
International Search Report for International Patent Application No. PCT/JP2015/080295 dated Feb. 2, 2016.

* cited by examiner

*Primary Examiner* — David J Buttner
(74) *Attorney, Agent, or Firm* — Foley & Lardner LLP

(57) ABSTRACT

Provided is a branched polycarbonate resin, including a constituent unit represented by the general formula (I').

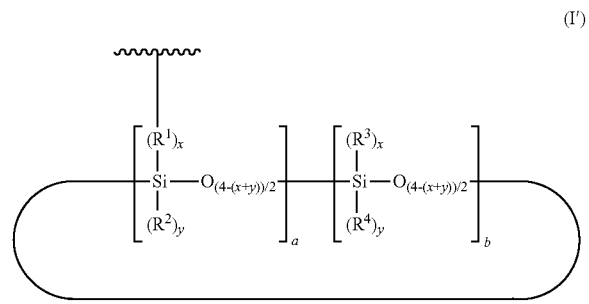

20 Claims, 2 Drawing Sheets

BRANCHED POLYCARBONATE RESIN AND METHOD FOR PRODUCING SAME

CROSS-REFERENCE TO RELATED APPLICATIONS

The present application is a U.S. national stage application of International Patent Application No. PCT/JP2015/080295, filed Oct. 27, 2015, which claims the benefit of priority to Japanese Patent Application No. 2014-222083, filed Oct. 30, 2014, the entireties of which are hereby incorporated by reference.

TECHNICAL FIELD

The present invention relates to a branched polycarbonate resin and a method of producing the resin.

BACKGROUND ART

A polycarbonate resin (hereinafter sometimes abbreviated as "PC resin") is excellent in, for example, transparency, mechanical characteristics, thermal stability, electrical properties, and weatherability, and hence has been used in an optical molded article, such as a light-guiding plate, a lens, or an optical disc, by taking advantage of such characteristics.

With regard to a polycarbonate resin having a branched structure out of such resins, in, for example, Patent Literature 1, there are disclosures of a branched polycarbonate using a branching agent of a siloxane tetrabranched structure that is not a cyclic structure and a method of producing the polycarbonate. In Patent Literature 2, there are disclosures of a branched polycarbonate using a hydrocarbon-based tetrafunctional branching agent and a method of producing the polycarbonate. In Patent Literature 3, there is a disclosure of a resin composition formed of a branching agent of a siloxane cyclic tetrabranched structure used in the present invention and an epoxy resin.

However, it cannot be said that the thermal stability of the branched polycarbonate resin disclosed in Patent Literature 1 is sufficient. In addition, the branching agent disclosed in Patent Literature 2 involves an industrial disadvantage because of the following reason. The branching agent is insoluble in dichloromethane or an oligomer/dichloromethane solution, and hence needs to be separately dissolved in an alkaline solution.

CITATION LIST

Patent Literature

PTL 1: JP 2004-182853 A
PTL 2: JP 11-60717 A
PTL 3: JP 06-256364 A

SUMMARY OF INVENTION

Technical Problem

An object of the present invention is to obtain a branched polycarbonate resin excellent in heat resistance and melt tension through the use of a branching agent having the following features: a raw material for the branching agent is industrially available with ease, and the branching agent has high solubility in dichloromethane or a dichloromethane solution of a polycarbonate oligomer.

Solution to Problem

The inventors of the present invention have found that the above-mentioned object is achieved by using a specific branching agent.

That is, the present invention relates to the following items [1] to [29].

[1] A branched polycarbonate resin, comprising a constituent unit represented by the general formula (I'):

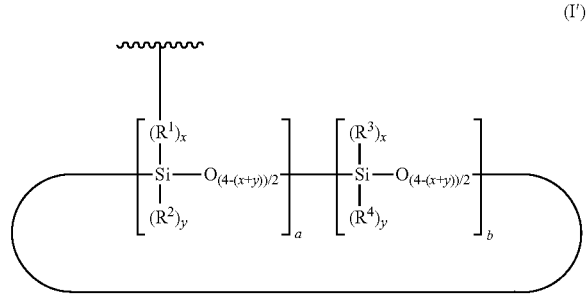

wherein $R^1$ represents —O-A-R—, A represents an arylene group having 6 to 12 carbon atoms, R represents an alkylene group having 1 to 6 carbon atoms, R is bonded to a Si atom, A may further have a substituent, and a plurality of $R^1$'s may be identical to or different from each other, $R^2$, $R^3$, and $R^4$ each independently represent an alkyl group having 1 to 6 carbon atoms, a phenyl group, and/or a trimethylsiloxy group, and a plurality of $R^2$'s, a plurality of $R^3$'s, or a plurality of $R^4$'s may be identical to or different from each other, x represents a number of 1 or more and less than 2, y represents a number of 0 or more and 1 or less, and x+y is 1 or more and 2 or less, and a represents a number of 4 or more and 16 or less, and b represents a number of 0 or more and 8 or less.

[2] The branched polycarbonate resin according to Item [1], wherein the constituent unit represented by the general formula (I') has a structure derived from a silsesquioxane.

[3] The branched polycarbonate resin according to Item [1] or [2], wherein a in the constituent unit represented by the general formula (I') represents 4 or more and 8 or less, and b therein represents 0.

[4] The branched polycarbonate resin according to Item [1] or [2], wherein a in the constituent unit represented by the general formula (I') represents 4, and b therein represents 0.

[5] The branched polycarbonate resin according to Item [1], wherein the constituent unit represented by the general formula (I') has a structure represented by the general formula (II') and/or the general formula (III'):

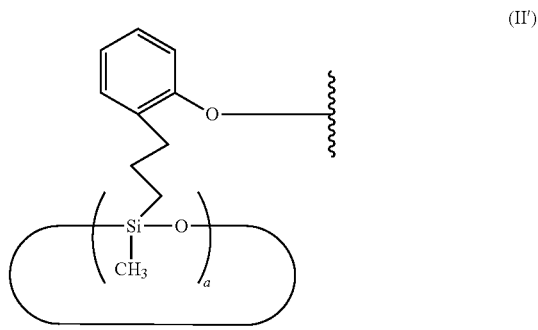

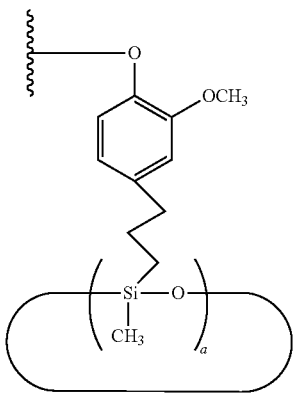

wherein a represents an integer of 4 or more and 16 or less.

[6] The branched polycarbonate resin according to Item [5], wherein a in the structure represented by the general formula (II') and/or the general formula (III') represents 4 or more and 8 or less.

[7] The branched polycarbonate resin according to Item [5], wherein a in the structure represented by the general formula (II') and/or the general formula (III') represents 4.

[8] The branched polycarbonate resin according to any one of Items [1] to [7], wherein a content of the constituent unit represented by the general formula (I') is from 0.1 mol % to 4.0 mol %.

[9] The branched polycarbonate resin according to any one of Items [1] to [8], wherein the resin has a viscosity-average molecular weight My of from 12,000 to 70,000.

[10] The branched polycarbonate resin according to any one of Items [1], [2], [8], and [9], wherein the constituent unit represented by the general formula (I') is derived from a branching agent represented by the general formula (I):

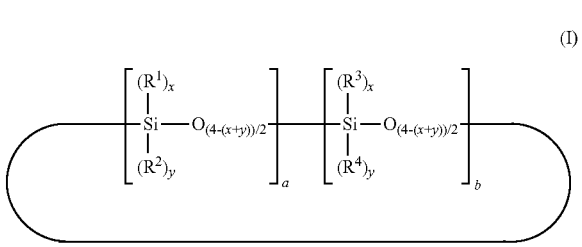

wherein $R^1$ represents HO-A-R—, A represents an arylene group having 6 to 12 carbon atoms, R represents an alkylene group having 1 to 6 carbon atoms, R is bonded to a Si atom, A may further have a substituent, and a plurality of $R^1$'s may be identical to or different from each other, $R^2$, $R^3$, and $R^4$ each independently represent an alkyl group having 1 to 6 carbon atoms, a phenyl group, and/or a trimethylsiloxy group, and a plurality of $R^2$'s, a plurality of $R^3$'s, or a plurality of $R^4$'s may be identical to or different from each other, x represents a number of 1 or more and less than 2, y represents a number of 0 or more and 1 or less, and x+y is 1 or more and 2 or less, and a represents a number of 4 or more and 16 or less, and b represents a number of 0 or more and 8 or less.

[11] The branched polycarbonate resin according to Item [10], wherein the branching agent has a silsesquioxane skeleton.

[12] The branched polycarbonate resin according to Item [10] or [11], wherein a in the general formula (I) represents 4 or more and 8 or less, and b therein represents 0.

[13] The branched polycarbonate resin according to Item [10] or [11], wherein a in the general formula (I) represents 4, and b therein represents 0.

[14] The branched polycarbonate resin according to Item [10], wherein the branching agent represented by the general formula (I) has a structure represented by the general formula (II) and/or the general formula (III):

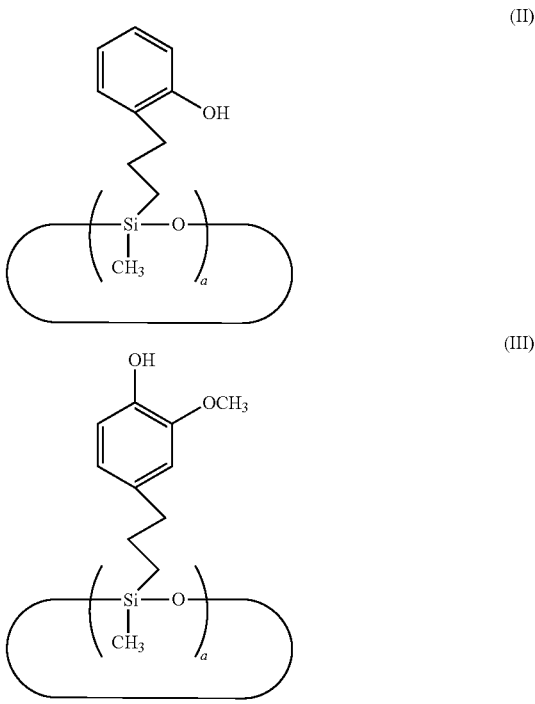

wherein a represents an integer of 4 or more and 16 or less.

[15] The branched polycarbonate resin according to Item [14], wherein a in the structure represented by the general formula (II) and/or the general formula (III) represents 4 or more and 8 or less.

[16] The branched polycarbonate resin according to Item [14], wherein a in the structure represented by the general formula (II) and/or the general formula (III) represents 4.

[17] The branched polycarbonate resin according to any one of Items [10] to [16], wherein the branching agent represented by the general formula (I) is soluble in dichloromethane.

[18] The branched polycarbonate resin according to Item [17], wherein the branching agent represented by the general formula (I) has a solubility in 100 g of dichloromethane of 0.0024 g or more.

[19] The branched polycarbonate resin according to Item [17], wherein the branching agent represented by the general formula (I) has a solubility in 100 g of dichloromethane of 0.77 g or more.

[20] The branched polycarbonate resin according to any one of Items [10] to [19], wherein the branching agent represented by the general formula (I) is soluble in a dichloromethane solution of a polycarbonate oligomer.

[21] The branched polycarbonate resin according to Item [20], wherein the branching agent represented by the general formula (I) has a solubility in 100 g of a dichloromethane solution of a polycarbonate oligomer of 0.0015 g or more.

[22] The branched polycarbonate resin according to Item [20], wherein the branching agent represented by the general formula (I) has a solubility in 100 g of a dichloromethane solution of a polycarbonate oligomer of 0.52 g or more.

[23] A polycarbonate resin composition, comprising:
the branched polycarbonate resin (A-1) of any one of Items [1] to [22]; and
a thermoplastic resin (A-2) except the (A-1).

[24] A method of producing the branched polycarbonate resin of any one of Items [1] to [22], comprising producing the resin through use of a dihydric phenol, a branching agent represented by the following general formula (I), an end terminator, and phosgene according to an interfacial polymerization method;

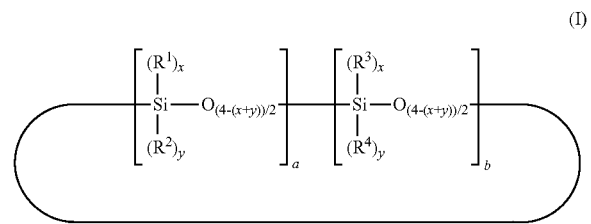

(I)

wherein $R^1$ represents HO-A-R—, A represents an arylene group having 6 to 12 carbon atoms, R represents an alkylene group having 1 to 6 carbon atoms, R is bonded to a Si atom, A may further have a substituent, and a plurality of $R^1$'s may be identical to or different from each other, $R^2$, $R^3$, and $R^4$ each independently represent an alkyl group having 1 to 6 carbon atoms, a phenyl group, and/or a trimethylsiloxy group, and a plurality of $R^2$'s, a plurality of $R^3$'s, or a plurality of $R^4$'s may be identical to or different from each other, x represents a number of 1 or more and less than 2, y represents a number of 0 or more and 1 or less, and x+y is 1 or more and 2 or less, and a represents a number of 4 or more and 16 or less, and b represents a number of 0 or more and 8 or less.

[25] The method of producing the branched polycarbonate resin according to Item [24],
wherein the method comprises;
a step (1) of causing the dihydric phenol and phosgene to react with each other to produce a polycarbonate oligomer; and
a step (2) of causing the polycarbonate oligomer, the dihydric phenol, and the end terminator to react with each other to produce the polycarbonate resin, and
wherein the branching agent is added to the step (1) and/or the step (2).

[26] The method of producing the branched polycarbonate resin according to Item [25], wherein when the branching agent is added to the step (2), the step (2) is performed after the polycarbonate oligomer obtained in the step (1) and the branching agent have been polymerized in advance.

[27] A molded body, comprising the branched polycarbonate resin of any one of Items [1] to [22], or the polycarbonate resin composition of Item [23].

[28] A lighting cover, comprising the branched polycarbonate resin of any one of Items [1] to [22], or the polycarbonate resin composition of Item [23].

[29] A lens, comprising the branched polycarbonate resin of any one of Items [1] to [22], or the polycarbonate resin composition of Item [23].

Advantageous Effects of Invention

According to the present invention, the branched polycarbonate resin having high thermal stability and a high melt tension while maintaining transparency can be obtained. In addition, the branched polycarbonate resin can be produced in an industrially advantageous manner by using a branching agent that is industrially available with ease and has a high solubility in dichloromethane or a dichloromethane solution of a polycarbonate oligomer.

DESCRIPTION OF EMBODIMENTS

Figure 1:
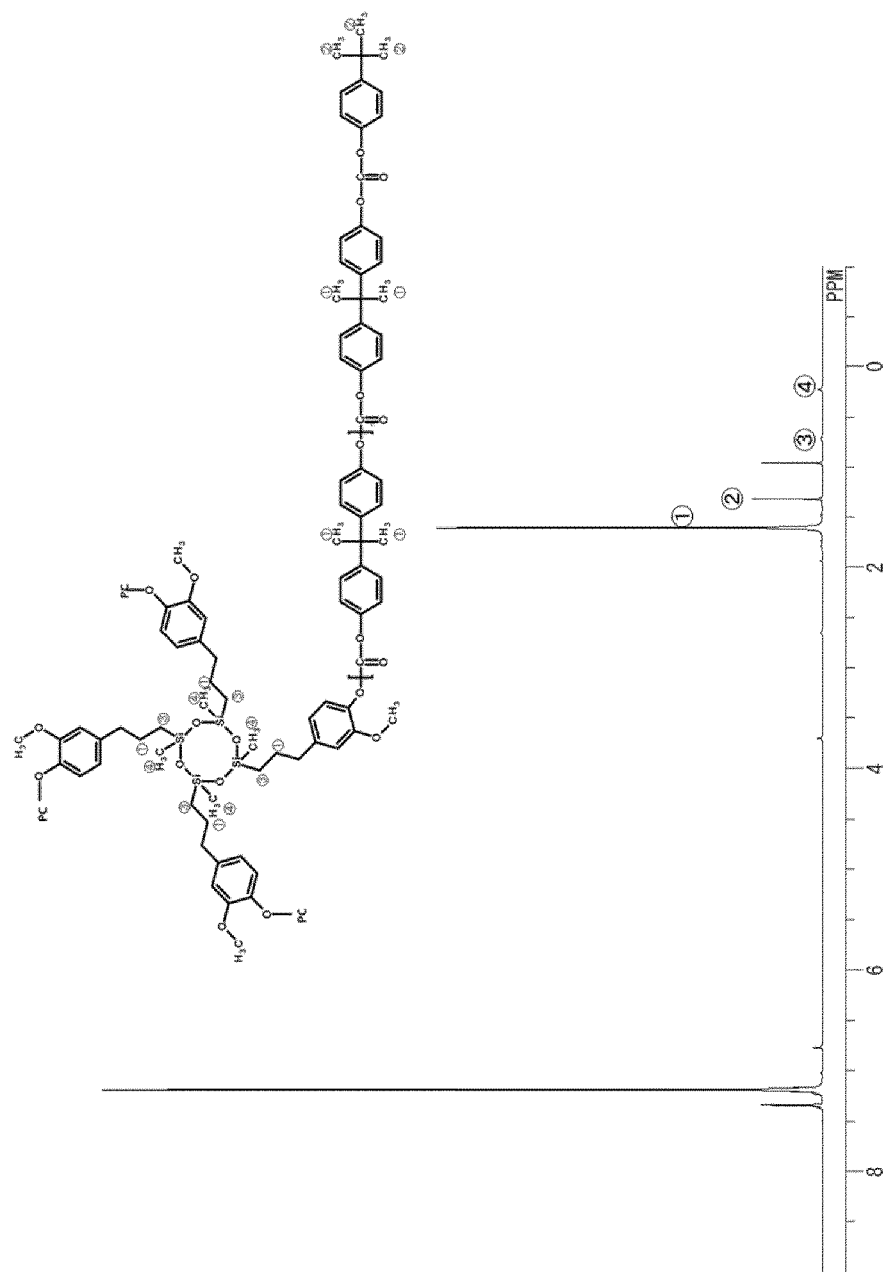
FIG. 1 is an NMR chart for showing a constituent unit represented by the general formula (I') of a branched polycarbonate resin in Examples.

A branched polycarbonate resin and a method of producing the resin of the present invention are described below. In this description, a specification considered to be preferred can be arbitrarily adopted, and a combination of preferred specifications can be said to be more preferred.

[Branched Polycarbonate Resin]

A branched polycarbonate resin of the present invention comprises a constituent unit represented by the general formula (I'):

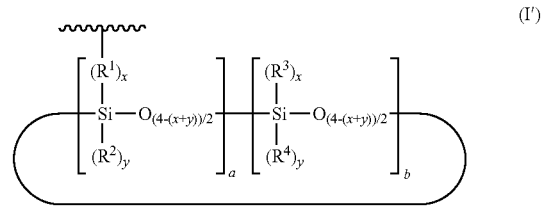

(I')

wherein $R^1$ represents —O-A-R—, A represents an arylene group having 6 to 12 carbon atoms, R represents an alkylene group having 1 to 6 carbon atoms, R is bonded to a Si atom, A may further have a substituent, and a plurality of $R^1$'s may be identical to or different from each other, $R^2$, $R^3$, and $R^4$ each independently represent an alkyl group having 1 to 6 carbon atoms, a phenyl group, and/or a trimethylsiloxy group, and a plurality of $R^2$'s, a plurality of $R^3$'s, or a plurality of $R^4$'s may be identical to or different from each other, x represents a number of 1 or more and less than 2, y represents a number of 0 or more and 1 or less, and x+y is 1 or more and 2 or less, and a represents a number of 4 or more and 16 or less, and b represents a number of 0 or more and 8 or less.

A wavy line portion represents a bond to the main chain of the polycarbonate resin.

For example, when, in the general formula (I'), x=y=1 and hence x+y is 2, the resin can have a cyclic siloxane structure. Meanwhile, for example, when x=1 and y=0, and hence x+y is 1, the resin can have a cage-like siloxane structure.

The branched polycarbonate resin of the present invention preferably has a constituent unit in which a represents 4 or more and 8 or less, and b represents 0 out of the constituent units each represent by the general formula (I'), and more preferably has a constituent unit in which a represents 4 and b represents 0 out of the units.

In the general formula (I'), A represents an arylene group having 6 to 12 carbon atoms, and preferably represents an orthophenylene group, a metaphenylene group, or a paraphenylene group. When A has a substituent, examples of the substituent may include an alkyl group, an alkoxy group, and/or a hydroxyl group. The alkyl group may be, for example, an alkyl group having 1 to 6 carbon atoms, and the alkoxy group may be, for example, a methoxy group.

In the general formula (I'), R (bonded to the Si atom) represents an alkylene group having 1 to 6 carbon atoms, and examples thereof may include a methylene group, an ethylene group, a propylene group, and a butylene group. Among them, an alkylene group having 1 to 4 carbon atoms is preferred, and a propylene group is more preferred.

Examples of the alkyl group having 1 to 6 carbon atoms represented by any one of $R^2$ to $R^4$ in the general formula (I') may include a methyl group, an ethyl group, a propyl group, and a butyl group. Among them, an alkyl group having 1 to 4 carbon atoms is preferred, and a methyl group is more preferred.

In addition, in the branched polycarbonate resin of the present invention, the constituent unit represented by the general formula (I') may have a structure represented by the general formula (II') and/or the general formula (III'):

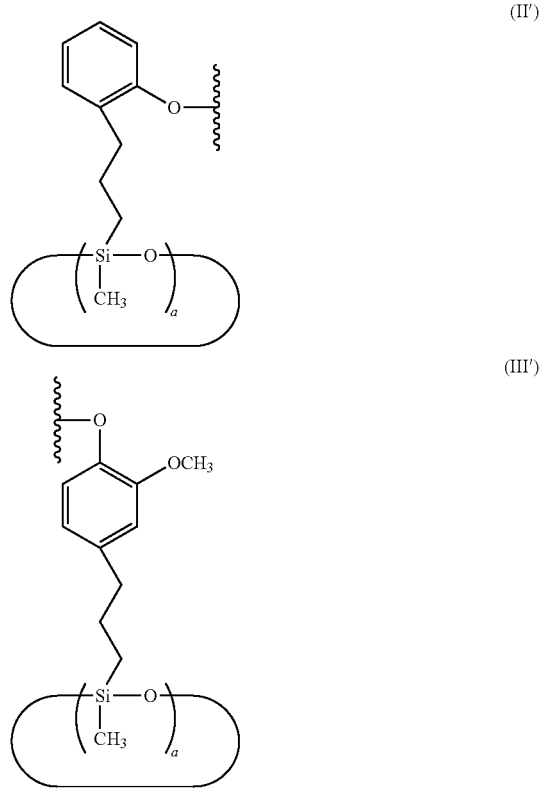

wherein a represents an integer of 4 or more and 16 or less.

In the branched polycarbonate resin of the present invention having the structure represented by the formula (II') or (III'), a in the formula more preferably represents 4 or more and 8 or less, and a still more preferably represents 4.

The branched polycarbonate resin shows a satisfactory melt tension because the resin has a branched structure. In addition, from the viewpoint of improving the melt tension while maintaining satisfactory flowability in a high-shear force region, a in the formula is required to represent 4 or more and 16 or less, and a preferably represents 4 or more and 8 or less as described above.

The content of the constituent unit represented by the general formula (I') in the branched polycarbonate resin of the present invention is preferably from 0.1 mol % to 4.0 mol %. When the content of the constituent unit represented by the general formula (I') is 0.1 mol % or more, a sufficient melt tension can be imparted to the branched polycarbonate resin. In addition, when the content is 4.0 mol % or less, the risk in that the polymer is crosslinked to gel is eliminated. In addition, the resin has satisfactory impact resistance, and hence a molded article to be obtained from the resin does not cause clouding on its surface and has excellent transparency. The branched polycarbonate resin of the present invention contains the constituent unit at a content of more preferably from 0.2 mol % to 3.0 mol %, particularly preferably from 0.5 mol % to 2.0 mol %.

In addition, a cage-like constituent unit having a silsesquioxane skeleton and constituent units derived from branching agents (II) to (X) each having a cyclic siloxane structure to be described later may also be given as preferred examples of the unit represented by the general formula (I'), though the units are not particularly described in detail.

The constituent unit represented by the general formula (I') of the branched polycarbonate resin of the present invention may be a constituent unit derived from, for example, a branching agent used at the time of its production, and the term "content of the constituent unit" as used herein means the mol % of the constituent unit derived from the branching agent with respect to the total number of moles of a constituent unit derived from a dihydric phenol, a constituent unit derived from an end terminator, and the constituent unit derived from the branching agent in the entirety of the polycarbonate resin, the dihydric phenol, the end terminator, and the branching agent being used as raw materials.

The viscosity-average molecular weight (Mv) of the branched polycarbonate resin of the present invention is preferably from 12,000 to 70,000. In the case where the viscosity-average molecular weight is 12,000 or more, a molded body having a sufficient strength is obtained. In addition, the case where the viscosity-average molecular weight is 70,000 or less is preferred because the risk in that the MVR of the polycarbonate resin becomes so low that a problem occurs at the time of its molding is eliminated.

The viscosity-average molecular weight (Mv) of the branched polycarbonate resin of the present invention is more preferably set to from 15,000 to 50,000.

In addition, the branched polycarbonate resin of the present invention is preferably an aromatic polycarbonate resin from the viewpoints of impact resistance and heat resistance.

As described above, the constituent unit represented by the general formula (I') of the branched polycarbonate resin of the present invention may be a constituent unit derived from the branching agent used at the time of its production. Such branching agent is described in detail below.

<Branching Agent>

An example of the branching agent may be a branching agent having a structure represented by the following general formula (I):

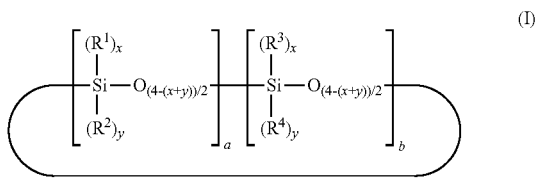

(I)

wherein $R^1$ represents HO-A-R—, A represents an arylene group having 6 to 12 carbon atoms, R represents an alkylene group having 1 to 6 carbon atoms, R is bonded to a Si atom, A may further have a substituent, and a plurality of $R^1$'s may be identical to or different from each other, $R^2$, $R^3$, and $R^4$ each independently represent an alkyl group having 1 to 6 carbon atoms, a phenyl group, and/or a trimethylsiloxy group, and a plurality of $R^2$'s, a plurality of $R^3$'s, or a plurality of $R^4$'s may be identical to or different from each other, x represents a number of 1 or more and less than 2, y represents a number of 0 or more and 1 or less, and x+y is 1 or more and 2 or less, and a represents a number of 4 or more and 16 or less, and b represents a number of 0 or more and 8 or less.

For example, when, in the general formula (I), x=y=1 and hence x+y is 2, the branching agent can have a cyclic siloxane structure. Meanwhile, for example, when x=1 and y=0, and hence x+y is 1, the branching agent can have a cage-like siloxane structure.

The branching agent preferably has a constituent unit in which a represents 4 or more and 8 or less, and b represents 0 in the general formula (I), and more preferably has a constituent unit in which a represents 4 and b represents 0.

In the general formula (I), A represents an arylene group having 6 to 12 carbon atoms, and preferably represents an orthophenylene group, a metaphenylene group, or a paraphenylene group. When A has a substituent, examples of the substituent may include an alkyl group, an alkoxy group, and/or a hydroxyl group. The alkyl group may be, for example, an alkyl group having 1 to 6 carbon atoms, and the alkoxy group may be, for example, a methoxy group.

In the general formula (I), R (bonded to the Si atom) represents an alkylene group having 1 to 6 carbon atoms, and examples thereof may include a methylene group, an ethylene group, a propylene group, and a butylene group. Among them, an alkylene group having 1 to 4 carbon atoms is preferred, and a propylene group is more preferred.

Examples of the alkyl group having 1 to 6 carbon atoms represented by any one of $R^2$ to $R^4$ in the general formula (I) may include a methyl group, an ethyl group, a propyl group, and a butyl group. Among them, an alkyl group having 1 to 4 carbon atoms is preferred, and a methyl group is more preferred.

The use of the branching agent having the structure represented by the general formula (I) can provide the branched polycarbonate resin of the present invention having the corresponding constituent unit represented by the general formula (I').

The branching agent having the cage-like siloxane structure may be, for example, a branching agent having a silsesquioxane skeleton.

More specifically, the branching agents represented by the following general formulae (II) to (X) can each be used as the branching agent having the cyclic siloxane structure:

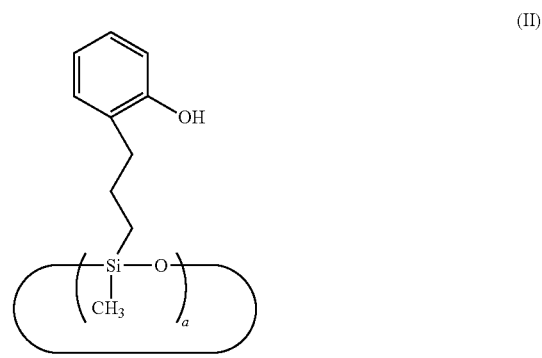

(II)

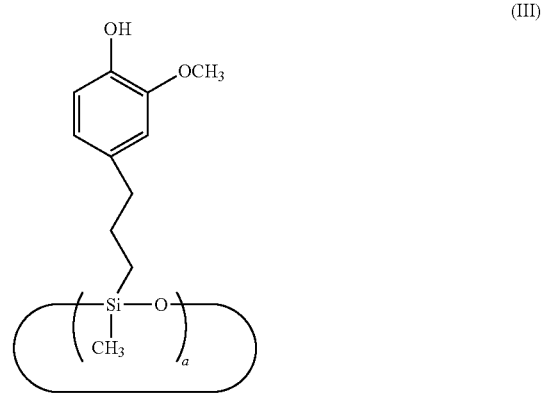

(III)

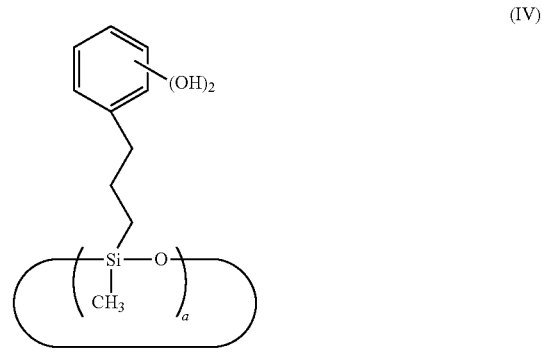

(IV)

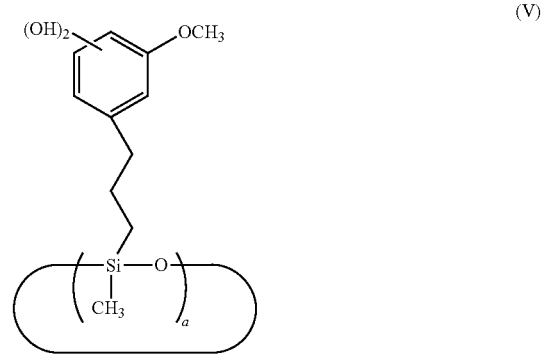

(V)

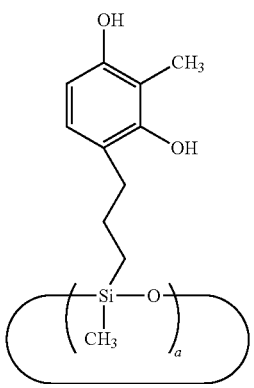
(VI)

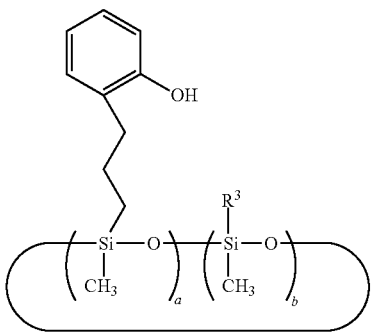
(VII)

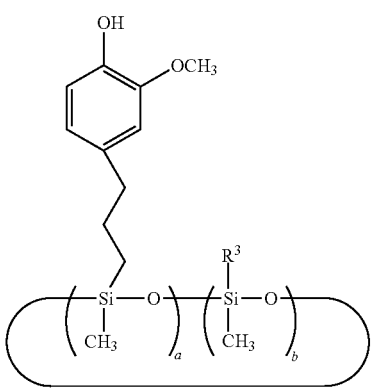
(VIII)

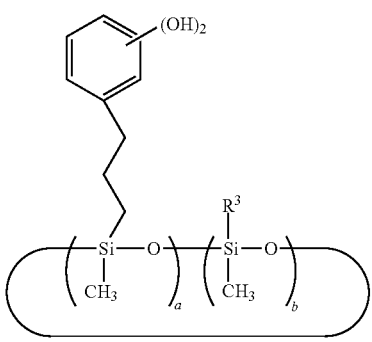
(IX)

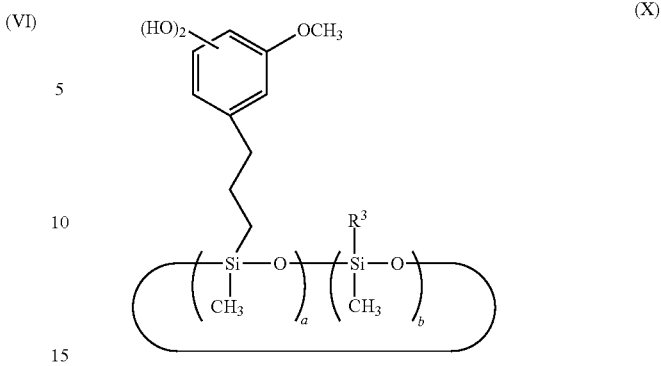
(X)

wherein in the general formulae (II) to (X), a's each independently represent an integer of from 4 to 16, preferably an integer of from 4 to 8, b's each represent 0 or an integer of from 1 to 8, and $R^3$'s each independently represent a methyl group, an ethyl group, a propyl group, a butyl group, or a phenyl group.

In each of the general formulae (II) to (X), it is more preferred that a represent 4 or more and 8 or less, and b represent 0, and it is still more preferred that a represent 4 and b represent 0.

Among such branching agents, a branching agent having a cyclic siloxane structure represented by any one of the general formulae (II) to (VI) in which a=4 is preferably used from the viewpoint of improving a solubility in dichloromethane or a dichloromethane solution of a polycarbonate oligomer, and thermal stability, and a branching agent having a structure represented by the general formula (II) and/or the general formula (III) is more preferred from the viewpoint of the ease of availability of a raw material. When the branching agent having the structure represented by the general formula (II) and/or the general formula (III) is used as the branching agent, a branched polycarbonate resin having the constituent unit represented by the general formula (I') having the structure represented by the general formula (II') and/or the general formula (III') described above is obtained.

The branching agents may be used alone or in combination thereof.

The branching agent to be used in the present invention is soluble in dichloromethane serving as a solvent to be used in an interfacial polymerization method. Accordingly, the branching agent has an advantage in that there is no need to dissolve the branching agent in any other solvent to separately prepare a branching agent solution. In addition, the branching agent is also soluble in a dichloromethane solution of a polycarbonate oligomer obtained by dissolving the polycarbonate oligomer in dichloromethane.

The solubility of the branching agent in 100 g of dichloromethane is preferably 0.0024 g or more, more preferably 0.77 g or more. In addition, the solubility thereof in 100 g of the dichloromethane solution of the polycarbonate oligomer is preferably 0.0015 g or more, more preferably 0.52 g or more.

[Method of Producing Branched Polycarbonate Resin]

A method of industrially producing the branched polycarbonate resin according to an interfacial polymerization method includes, for example, a step (1) of causing a dihydric phenol and phosgene to react with each other to produce a polycarbonate oligomer, and a step (2) of causing the polycarbonate oligomer, the dihydric phenol, and an end terminator, and in some cases, a polyorganosiloxane to react with each other to produce the polycarbonate resin. Here, the branching agent of the present invention can be added to the step (1) and/or the step (2).

When the branching agent is added to the step (2), the step (2) is preferably performed after the polycarbonate oligomer obtained in the step (1) and the branching agent have been polymerized in advance.

A reaction temperature in the step (1) is selected from the range of typically from 0° C. to 80° C., preferably from 5° C. to 70° C. In the step (2), interfacial polymerization is performed at a reaction temperature in the range of typically from 0° C. to 50° C., preferably from 20° C. to 40° C.

<Dihydric Phenol>

A dihydric phenol represented by the following general formula (1) is preferably used as the dihydric phenol:

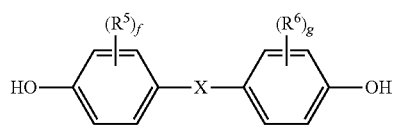

wherein $R^5$ and $R^6$ each independently represent a halogen atom, an alkyl group having 1 to 6 carbon atoms, or an alkoxy group having 1 to 6 carbon atoms, X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, a fluorenediyl group, an arylalkylene group having 7 to 15 carbon atoms, an arylalkylidene group having 7 to 15 carbon atoms, —S—, —SO—, —SO$_2$—, —O—, or —CO—, and f and g each independently represent an integer of from 0 to 4.

Examples of the dihydric phenol represented by the general formula (1) include: bis(hydroxyphenyl)alkanes, such as 2,2-bis(4-hydroxyphenyl)propane [bisphenol A], bis(4-hydroxyphenyl)methane, 1,1-bis(4-hydroxyphenyl)ethane, and 2,2-bis(4-hydroxy-3,5-dimethylphenyl)propane; and 4,4'-dihydroxydiphenyl, bis(4-hydroxyphenyl)cycloalkane, bis(4-hydroxyphenyl) oxide, bis(4-hydroxyphenyl) sulfide, bis(4-hydroxyphenyl) sulfone, bis(4-hydroxyphenyl) sulfoxide, and bis(4-hydroxyphenyl) ketone. Those dihydric phenols may be used alone or as a mixture thereof.

Among them, bis(hydroxyphenyl)alkanes are each preferred as the dihydric phenol, and bisphenol A is more preferred.

Examples of the dihydric phenol except bisphenol A include bis(hydroxyaryl)alkanes, bis(hydroxyaryl)cycloalkanes, dihydroxyaryl ethers, dihydroxydiaryl sulfides, dihydroxydiaryl sulfoxides, dihydroxydiaryl sulfones, dihydroxydiphenyls, dihydroxydiarylfluorenes, and dihydroxydiaryladamantanes. Those dihydric phenols may be used alone or as a mixture thereof.

Examples of the bis(hydroxyaryl)alkanes include bis(4-hydroxyphenyl)methane, 1,1-bis(4-hydroxyphenyl)ethane, 2,2-bis(4-hydroxyphenyl)butane, 2,2-bis(4-hydroxyphenyl)octane, bis(4-hydroxyphenyl)phenylmethane, bis(4-hydroxyphenyl)diphenylmethane, 2,2-bis(4-hydroxy-3-methylphenyl)propane, bis(4-hydroxyphenyl)naphthylmethane, 1,1-bis(4-hydroxy-3-t-butylphenyl)propane, 2,2-bis(4-hydroxy-3-bromophenyl)propane, 2,2-bis(4-hydroxy-3,5-dimethylphenyl)propane, 2,2-bis(4-hydroxy-3-chlorophenyl)propane, 2,2-bis(4-hydroxy-3,5-dichlorophenyl)propane, and 2,2-bis(4-hydroxy-3,5-dibromophenyl)propane.

Examples of the bis(hydroxyaryl)cycloalkanes include 1,1-bis(4-hydroxyphenyl)cyclopentane, 1,1-bis(4-hydroxyphenyl)cyclohexane, 1,1-bis(4-hydroxyphenyl)-3,5,5-trimethylcyclohexane, 2,2-bis(4-hydroxyphenyl)norbornane, and 1,1-bis(4-hydroxyphenyl)cyclododecane. Examples of the dihydroxyaryl ethers include 4,4'-dihydroxydiphenyl ether and 4,4'-dihydroxy-3,3'-dimethylphenyl ether.

Examples of the dihydroxydiaryl sulfides include 4,4'-dihydroxydiphenyl sulfide and 4,4'-dihydroxy-3,3'-dimethyldiphenyl sulfide. Examples of the dihydroxydiaryl sulfoxides include 4,4'-dihydroxydiphenyl sulfoxide and 4,4'-dihydroxy-3,3'-dimethyldiphenyl sulfoxide. Examples of the dihydroxydiaryl sulfones include 4,4'-dihydroxydiphenyl sulfone and 4,4'-dihydroxy-3,3'-dimethyldiphenyl sulfone.

An example of the dihydroxydiphenyls is 4,4'-dihydroxydiphenyl. Examples of the dihydroxydiarylfluorenes include 9,9-bis(4-hydroxyphenyl)fluorene and 9,9-bis(4-hydroxy-3-methylphenyl)fluorene. Examples of the dihydroxydiaryladamantanes include 1,3-bis(4-hydroxyphenyl)adamantane, 2,2-bis(4-hydroxyphenyl)adamantane, and 1,3-bis(4-hydroxyphenyl)-5,7-dimethyladamantane.

Examples of the dihydric phenols except the above-mentioned dihydric phenols include 4,4'-[1,3-phenylenebis (1-methylethylidene)]bisphenol, 10,10-bis(4-hydroxyphenyl)-9-anthrone, and 1,5-bis(4-hydroxyphenylthio)-2,3-dioxapentane.

Among the dihydric phenols, 2,2-bis(4-hydroxyphenyl) propane, 2,2-bis[(4-hydroxy-3-methyl)phenyl]propane, 2,2-bis(4-hydroxyphenyl)butane, 2,2-bis(4-hydroxyphenyl)-3-methylbutane, 2,2-bis(4-hydroxyphenyl)-3,3-dimethylbutane, 2,2-bis(4-hydroxyphenyl)-4-methylpentane, 1,1-bis(4-hydroxyphenyl)-3,3,5-trimethylcyclohexane, and α,α'-bis(4-hydroxyphenyl)-m-diisopropylbenzene are preferably used, and 2,2-bis(4-hydroxyphenyl)propane [common name: bisphenol A] is particularly preferably used. In addition, the dihydric phenol may be a homopolymer using one kind of the dihydric phenols, or may be a copolymer using two or more kinds thereof.

<Carbonate Precursor>

Examples of a carbonate precursor to be used in the present invention may include a carbonyl halide, a carbonic acid diester, and a haloformate. Specific examples thereof include phosgene, a dihaloformate of a dihydric phenol, diphenyl carbonate, dimethyl carbonate, and diethyl carbonate. Among them, phosgene to be used in the interfacial polymerization method is more preferred.

The carbonate precursors may be used alone or in combination thereof.

<End Terminator>

The end terminator is not particularly limited as long as the end terminator is a monohydric phenol, and examples thereof include phenol, o-n-butylphenol, m-n-butylphenol, p-n-butylphenol, o-isobutylphenol, m-isobutylphenol, p-isobutylphenol, o-t-butylphenol, m-t-butylphenol, p-t-butylphenol, o-n-pentylphenol, m-n-pentylphenol, p-n-pentylphenol, o-n-hexylphenol, m-n-hexylphenol, p-n-hexylphenol, p-t-octylphenol, o-cyclohexylphenol, m-cyclohexylphenol, p-cyclohexylphenol, o-phenylphenol, m-phenylphenol, p-phenylphenol, o-n-nonylphenol, m-n-nonylphenol, p-n-nonylphenol, o-cumylphenol, m-cumylphenol, p-cumylphenol, o-naphthylphenol, m-naphthylphenol, p-naphthylphenol, 2,5-di-t-butylphenol, 2,4-di-t-butylphenol, 3,5-di-t-butylphenol, 2,5-dicumylphenol, 3,5-dicumylphenol, p-cresol, a monoalkyl phenol having a linear or branched alkyl group having an average number of carbon atoms of from 12 to 35 at the ortho-, meta-, or para-position, 3-pentadecylphenol, 9-(4-hydroxyphenyl)-9-(4-methoxyphenyl)fluorene, 9-(4-hydroxy-3-methylphenyl)-9-(4-methoxy-3-methylphenyl)fluorene, and 4-(1-adamantyl)phenol.

Among them, p-t-butylphenol, p-cumylphenol, and p-phenylphenol are preferred, and p-t-butylphenol is more preferred. Those end terminators may be used alone or in combination thereof.

<Polyorganosiloxane>

A polyorganosiloxane represented by the following general formula (2), (3), and/or (4) can be used as the polyorganosiloxane:

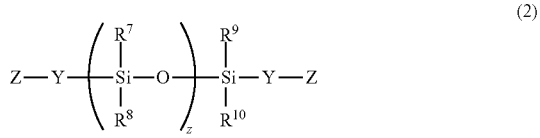

(2)

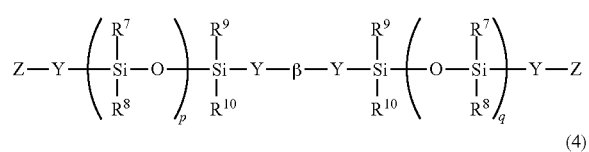

(3)

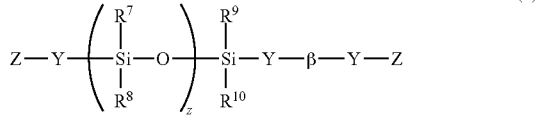

(4)

wherein $R^7$ to $R^{10}$ each independently represent a hydrogen atom, a halogen atom, an alkyl group having 1 to 6 carbon atoms, an alkoxy group having 1 to 6 carbon atoms, or an aryl group having 6 to 12 carbon atoms, and a plurality of $R^7$'s to $R^{10}$'s may be identical to or different from each other, Y represents a single bond, —$R^{11}$O—, —$R^{11}$COO—, —$R^{11}$NH—, —$R^{11}$NHR$^{12}$—, —COO—, —S—, —$R^{11}$COO—$R^{13}$—O—, or —$R^{11}$O—$R^{14}$—O—, and a plurality of Y's may be identical to or different from each other, the $R^{11}$ represents a single bond, a linear, branched, or cyclic alkylene group, an aryl-substituted alkylene group, a substituted or unsubstituted arylene group, or a diarylene group, $R^{12}$ represents an alkyl group, an alkenyl group, an aryl group, or an aralkyl group, $R^{13}$ represents a diarylene group, $R^{14}$ represents a linear, branched, or cyclic alkylene group, or a diarylene group, Z represents a hydrogen atom or a halogen atom, and a plurality of Z's may be identical to or different from each other, β represents a single bond, a divalent group derived from a diisocyanate compound, or a divalent group derived from a dicarboxylic acid or a halide of a dicarboxylic acid, p and q each represent an integer of 1 or more, a sum of p and q is from 20 to 500, and z represents an average number of repetitions of from 20 to 500.

Examples of the halogen atom that $R^7$ to $R^{10}$ each independently represent include a fluorine atom, a chlorine atom, a bromine atom, and an iodine atom. Examples of the alkyl group that $R^7$ to $R^{10}$ each independently represent include a methyl group, an ethyl group, a n-propyl group, an isopropyl group, various butyl groups ("various" means that a linear group and any branched group are included, and the same holds true for the following), various pentyl groups, and various hexyl groups. An example of the alkoxy group that $R^7$ to $R^{10}$ each independently represent is an alkoxy group whose alkyl group moiety is the alkyl group described above. Examples of the aryl group that $R^7$ to $R^{10}$ each independently represent include a phenyl group and a naphthyl group.

In the formulae, $R^7$ to $R^{10}$ each preferably represent a hydrogen atom, an alkyl group having 1 to 6 carbon atoms, an alkoxy group having 1 to 6 carbon atoms, or an aryl group having 6 to 12 carbon atoms.

The polyorganosiloxane represented by the general formula (2), (3), and/or (4) is preferably a polyorganosiloxane in which $R^7$ to $R^{10}$ each represent a methyl group.

The linear or branched alkylene group represented by $R^{11}$ in —$R^{11}$O—, —$R^{11}$COO—, —$R^{11}$NH—, —$R^{11}$NHR$^{12}$—, —COO—, —S—, —$R^{11}$COO—$R^{13}$—O—, or —$R^{11}$O—$R^{14}$—O— represented by Y is, for example, an alkylene group having 1 to 8 carbon atoms, preferably 1 to 5 carbon atoms, and the cyclic alkylene group represented by $R^{11}$ is, for example, a cycloalkylene group having 5 to 15 carbon atoms, preferably 5 to 10 carbon atoms.

The aryl-substituted alkylene group represented by $R^{11}$ may have a substituent, such as an alkoxy group or an alkyl group, on its aromatic ring, and its specific structure may be, for example, a structure represented by the following general formula (5) or (6). When the polyorganosiloxane has the aryl-substituted alkylene group, the alkylene group is bonded to Si.

(5)

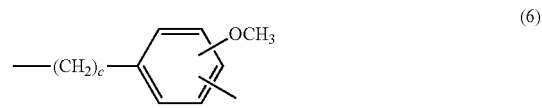

(6)

In the formulae, c represents a positive integer and typically represents an integer of 1 or more and 6 or less.

The diarylene group represented by each of $R^{11}$, $R^{13}$, and $R^{14}$ refers to a group in which two arylene groups are linked to each other directly or through a divalent organic group, and is specifically a group having a structure represented by —Ar$^1$—W—Ar$^2$—. Here, Ar$^1$ and Ar$^2$ each represent an arylene group, and W represents a single bond or a divalent organic group. Examples of the divalent organic group represented by W include an isopropylidene group, a methylene group, a dimethylene group, and a trimethylene group.

Examples of the arylene group represented by each of $R^{11}$, Ar$^1$, and Ar$^2$ include arylene groups each having 6 to 14 ring-forming carbon atoms, such as a phenylene group, a naphthylene group, a biphenylene group, and an anthrylene group. Those arylene groups may each have an arbitrary substituent, such as an alkoxy group or an alkyl group.

The alkyl group represented by $R^{12}$ is a linear or branched alkyl group having 1 to 8, preferably 1 to 5 carbon atoms. The alkenyl group represented by $R^{12}$ is, for example, a linear or branched alkenyl group having 2 to 8, preferably 2 to 5 carbon atoms. The aryl group represented by $R^{12}$ is, for example, a phenyl group or a naphthyl group. The aralkyl group represented by $R^{12}$ is, for example, a phenylmethyl group or a phenylethyl group.

The linear, branched, or cyclic alkylene group represented by $R^{14}$ is the same as that represented by $R^{11}$.

In the formulae, Y preferably represents —$R^{11}$O—, and $R^{11}$ represents an aryl-substituted alkylene group, in particular a residue of a phenol-based compound having an alkyl group, and more preferably represents an organic residue derived from allylphenol or an organic residue derived from eugenol.

With regard to p and q in the general formula (3), it is preferred that p=q, i.e., p=z/2 and q=z/2.

The average number z of repetitions is preferably from 20 to 500, more preferably from 50 to 400, still more preferably from 70 to 300. When the z is 20 or more, the PC-POS can obtain excellent impact resistance, and significant restoration of the impact resistance can be achieved. When the z is 500 or less, handleability at the time of the production of the PC-POS is excellent. The number z of repeating units can be calculated by $^1$H-NMR.

In addition, β represents a divalent group derived from a diisocyanate compound, or a divalent group derived from a dicarboxylic acid or a halide of a dicarboxylic acid, and examples thereof include divalent groups represented by the following general formulae (7-1) to (7-5).

(7-1)
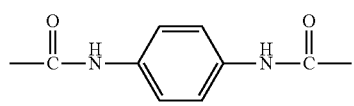

(7-2)
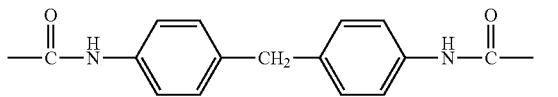

(7-3)
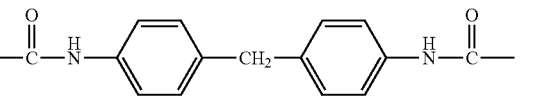

(7-4)
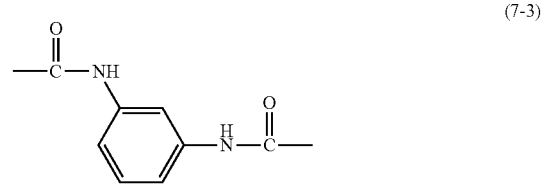

(7-5)
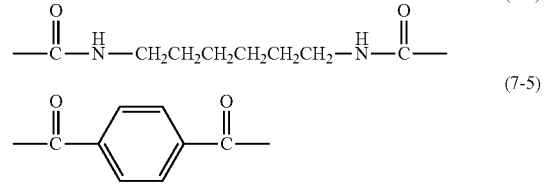

Examples of the polyorganosiloxane represented by the general formula (2) include compounds represented by the following general formulae (2-1) to (2-11):

(2-1)
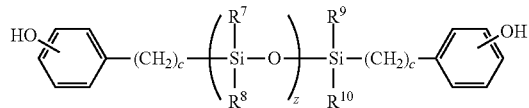

(2-2)
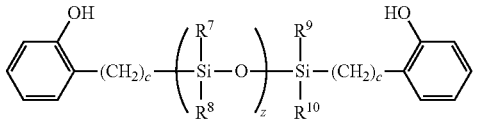

(2-3)
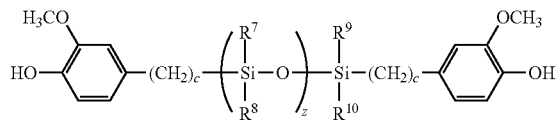

(2-4)
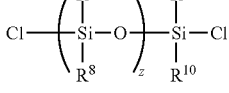

(2-5)
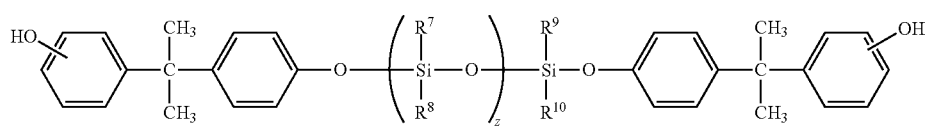

(2-6)
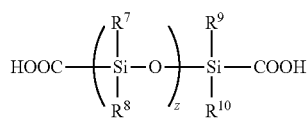

(2-7)
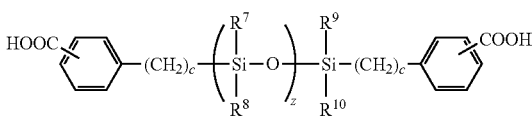

(2-8)
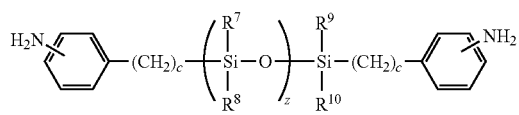

(2-9)
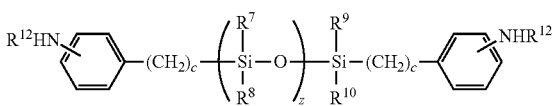

(2-10)
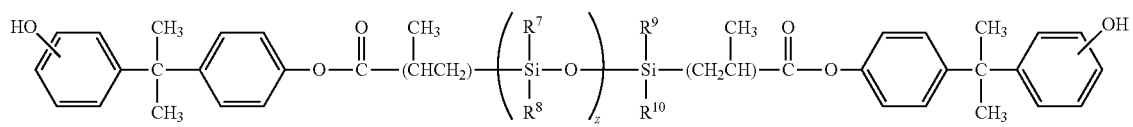

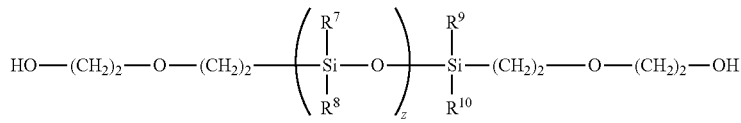

(2-11)

wherein
in the general formulae (2-1) to (2-11), $R^7$ to $R^{10}$, z, and $R^{12}$ are as defined above, and preferred groups and values thereof are also the same. In the formulae, c represents a positive integer and typically represents an integer of from 1 to 6.

Among them, a phenol-modified polyorganosiloxane represented by the general formula (2-1) is preferred from the viewpoint of the ease of polymerization. In addition, α,ω-bis[3-(o-hydroxyphenyl)propyl]polydimethylsiloxane as one kind of the compounds each represented by the general formula (2-2) or α, ω-bis [3-(4-hydroxy-3-methoxyphenyl)propyl]polydimethylsiloxane as one kind of the compounds each represented by the general formula (2-3) is preferred from the viewpoint of the ease of availability.

<Polymerization Catalyst>

A phase-transfer catalyst is suitable as a polymerization catalyst, and for example, a tertiary amine or a salt thereof, a quaternary ammonium salt, or a quaternary phosphonium salt can be preferably used.

Examples of the tertiary amine include triethylamine, tributylamine, N,N-dimethylcyclohexylamine, pyridine, and dimethylaniline. Examples of the tertiary amine salt include hydrochlorides and bromates of those tertiary amines. Examples of the quaternary ammonium salt include trimethylbenzylammonium chloride, triethylbenzylammonium chloride, tributylbenzylammonium chloride, trioctylmethylammonium chloride, tetrabutylammonium chloride, and tetrabutylammonium bromide. Examples of the quaternary phosphonium salt include tetrabutylphosphonium chloride and tetrabutylphosphonium bromide. The polymerization catalysts may be used alone or in combination thereof.

Among the polymerization catalysts, tertiary amines are preferred, and triethylamine is particularly suitable.

<Organic Solvent>

An inert organic solvent is suitable as an organic solvent, and for example, a chlorinated hydrocarbon, toluene, or acetophenone can be preferably used.

Examples of chlorinated hydrocarbon include dichloromethane (methylene chloride), trichloromethane, carbon tetrachloride, 1,1-dichloroethane, 1,2-dichloroethane, 1,1,1-trichloroethane, 1,1,2-trichloroethane, 1,1,1,2-tetrachloroethane, 1,1,2,2-tetrachloroethane, pentachloroethane, and chlorobenzene. The organic solvents may be used alone or in combination thereof. Among the organic solvents, dichloromethane is particularly suitable.

The usage amount of the organic solvent is typically selected so that a volume ratio between an organic phase and an aqueous phase may be preferably from 5/1 to 1/7, more preferably from 2/1 to 1/4.

<Alkaline Aqueous Solution>

Examples of an alkaline aqueous solution may include aqueous solutions of alkaline inorganic compounds including: alkali metal hydroxides, such as sodium hydroxide and potassium hydroxide; and alkaline earth metal hydroxides, such as magnesium hydroxide and calcium hydroxide. Among them, an aqueous solution of an alkali metal hydroxide is preferred, and an aqueous solution of sodium hydroxide or potassium hydroxide is more preferred.

In normal cases, a solution having an alkali concentration of from 1 mass % to 15 mass % is preferably used as the alkaline aqueous solution into which the dihydric phenol is dissolved. The amount of the dihydric phenol in the alkaline aqueous solution is typically selected from the range of from 0.5 mass % to 20 mass %.

[Polycarbonate Resin Composition]

A polycarbonate resin composition of the present invention contains the branched polycarbonate resin (A-1) of the present invention, and may further contain a thermoplastic resin (A-2) except the (A-1).

Examples of the thermoplastic resin (A-2) include a polycarbonate resin except the (A-1), a styrene-based resin, a polyethylene resin, a polypropylene resin, a polymethyl methacrylate resin, a polyvinyl chloride resin, a cellulose acetate resin, a polyamide resin, a polyester resin (e.g., PET or PBT), polylactic acid and/or a copolymer containing polylactic acid, a polyacrylonitrile resin, an acrylonitrile-butadiene-styrene resin (ABS resin), a polyphenylene oxide resin (PPO), a polyketone resin, a polysulfone resin, a polyphenylene sulfide resin (PPS), a fluorine resin, a silicon resin, a polyimide resin, a polybenzimidazole resin, and a polyamide elastomer, and copolymers thereof with other monomers.

An additive component that has been commonly used in a thermoplastic resin can be added and incorporated into the polycarbonate resin composition of the present invention as required. Examples of the additive component include a plasticizer, a stabilizer, an inorganic filler, a flame retardant, a silicone-based compound, and a fluorine resin. The blending amount of the additive component is not particularly limited as long as the amount falls within such a range that the characteristics of the polycarbonate resin composition of the present invention are maintained.

The polycarbonate resin composition of the present invention is obtained by blending the respective components (A-1) and (A-2) at the blending ratios, further blending the other additive component at an arbitrary ratio, and kneading the components at a temperature of from about 200° C. to about 350° C. The blending and the kneading at this time can be performed by the following method: the components are preliminarily mixed with an instrument that has been typically used, such as a ribbon blender or a drum tumbler, and the resultant is kneaded with a Henschel mixer, a Banbury mixer, a single screw extruder, a twin-screw extruder, a multi-screw extruder, a co-kneader, or the like. In ordinary cases, a heating temperature at the time of the kneading is appropriately selected from the range of from 240° C. to 330° C.

The polycarbonate resin composition of the present invention can be molded into a molded body excellent in flame retardancy by, for example, a hollow molding (blow molding) method, an injection molding method, an extrusion molding method, a vacuum molding method, a pressure molding method, a heat bending molding method, a calender molding method, or a rotational molding method through the use of the molten kneaded product or the resultant pellet as a raw material. The branched polycarbonate resin of the present invention is particularly suitable for the hollow molding out of the methods because the resin has a high melt tension.

A molded article containing the branched polycarbonate resin of the present invention can be suitably used in various industrial applications, such as a lighting cover, a lens, a water bottle, a protective cover for a display, OA equipment, and electrical and electronic fields.

EXAMPLES

The present invention is more specifically described by way of Examples. However, the present invention is by no means limited by these Examples.

[Methods of measuring Physical Property Values]
<Primary Structure>
(1) Viscosity-Average Molecular Weight (Mv)

The viscosity of a dichloromethane solution at 20° C. was measured with an Ubbelohde-type viscometer. A limiting viscosity [η] was determined from the resultant value, and a viscosity-average molecular weight (Mv) was calculated from an equation "$[\eta]=1.23\times10^{-5} \text{ Mv}^{0.83}$."

(2) Content of Constituent Unit (I')

The content (mol %) of a constituent unit (I') derived from a branching agent was calculated by the following method.
(2)-1: when Constituent Unit (I') is Derived from Branching Agent (1)

The polycarbonate resin of the present invention using a branching agent (1) was dissolved in a mixed solvent containing $CDCl_3$ and $C_6D_6$ at a ratio of 1/1, and its $^1$H-NMR spectrum was measured with a nuclear magnetic resonance apparatus ECA500 manufactured by JEOL Ltd. The content was calculated from the integrated value of the spectrum. A method for the calculation is described below.

Respective ratios are determined from the integrated values of the following chemical shifts on an NMR chart (FIG. 1). A chemical shift value is different from the true value to some extent in some cases, and hence in such cases, a method for the calculation of an integrated value may be appropriately changed. When, in FIG. 1, the integrated value of a signal observed at δ=1.61 ppm is represented by (i), the integrated value of a signal observed at δ=1.32 ppm is represented by (ii), the integrated value of a signal observed at δ=0.72 ppm is represented by (iii), and the integrated value of a signal observed at δ=0.24 ppm is represented by (iv), the content of the branching agent (1) is calculated from the following equation in consideration of the number of protons.

BPA=((*i*)−(*iii*))/6  a

PTBP=(*ii*)/9  b

Branching agent(1)=(*iv*)/12  c

Content of branching agent(1)=*c*/(*a*+*b*+*c*)×100 (mol %)

(2)-2: when Constituent Unit (I') is Derived from Branching Agent (2)

The polycarbonate resin of the present invention using a branching agent (2) was dissolved in a $CDCl_3$ solvent, and its $^1$H-NMR spectrum was measured with a nuclear magnetic resonance apparatus ECA500 manufactured by JEOL Ltd. The content was calculated from the integrated value of the spectrum. A method for the calculation is described below.

Figure 2:
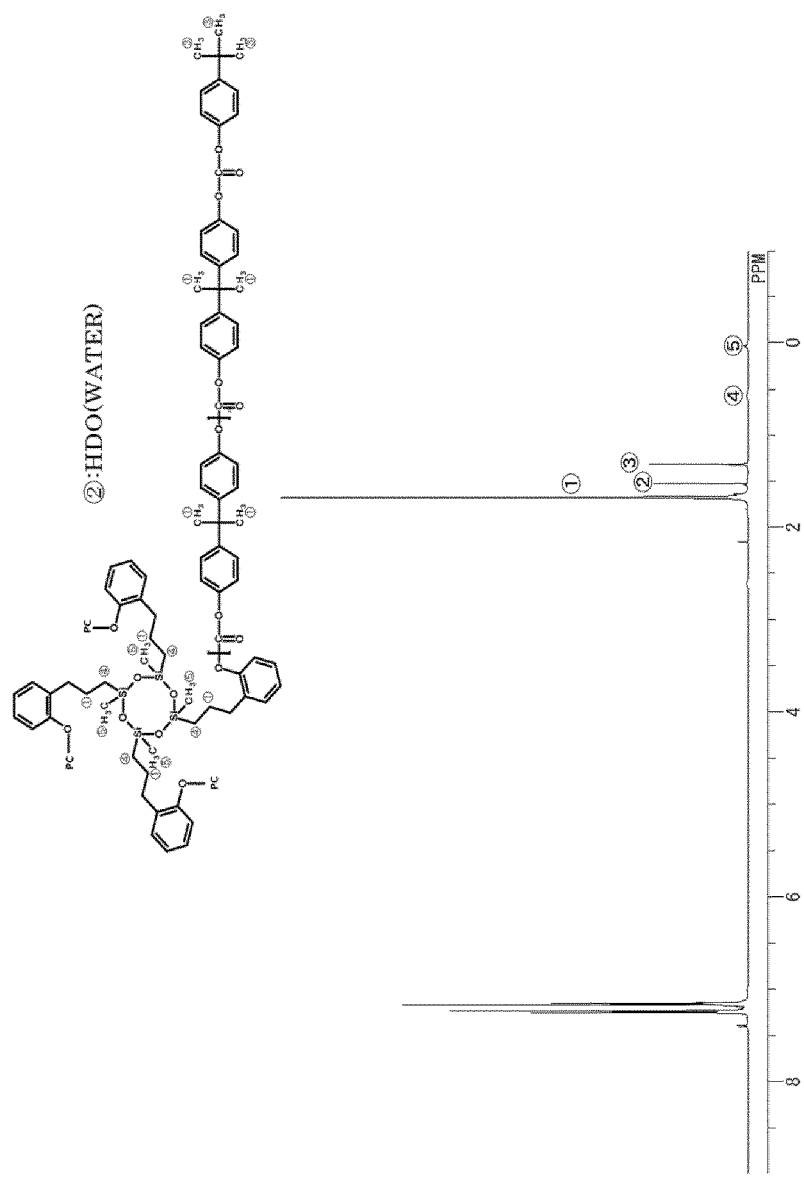
FIG. 2 is an NMR chart for showing a constituent unit represented by the general formula (I') of a branched polycarbonate resin in Examples.

Respective ratios are determined from the integrated values of the following chemical shifts on an NMR chart (FIG. 2). A chemical shift value is different from the true value to some extent in some cases, and hence in such cases, a method for the calculation of an integrated value may be appropriately changed. When, in FIG. 2, the integrated value of a signal observed at δ=1.68 ppm is represented by (i), the integrated value of a signal observed at δ=1.53 ppm is represented by (ii), the integrated value of a signal observed at δ=1.32 ppm is represented by (iii), the integrated value of a signal observed at δ=0.58 ppm is represented by (iv), and the integrated value of a signal observed at δ=0.03 ppm is represented by (v), the content of the branching agent (2) is calculated from the following equation in consideration of each of the numbers of protons.

BPA=((*i*)−(*ii*)−(*iv*))/6  a

PTBP=(*iii*)/9  b

Branching agent(2)=(*v*)/12  c

<Solubility>
(3) Solubility in Dichloromethane 0.33 g of a branching agent was loaded into 31 mL of dichloromethane. The presence or absence of a precipitate and cloudiness was visually observed, and when the precipitate and the cloudiness were absent, it was judged that the branching agent was dissolved.

(4) Solubility in Dichloromethane Solution of Polycarbonate Oligomer 0.33 g of a branching agent was loaded into 50 mL of a dichloromethane solution of a polycarbonate oligomer obtained by dissolving 16 g of the polycarbonate oligomer in 37 mL of dichloromethane. The presence or absence of a precipitate and cloudiness was visually observed, and when the precipitate and the cloudiness were absent, it was judged that the branching agent was dissolved. The term "dichloromethane solution of the polycarbonate oligomer" as used herein refers to a dichloromethane solution of a polycarbonate oligomer obtained by the step of synthesizing a polycarbonate oligomer in each of Examples.

<Thermal Stability>
(5) Thermal Stability

A polycarbonate was heated with a small electric furnace manufactured by Shinsei Denro Seisakusho K.K. under a nitrogen atmosphere at 280° C. for 12 minutes. Subsequently, the transmittance (optical path length: 1 cm, wavelength: 420 nm) of a 5.0 wt % dichloromethane solution of the polycarbonate was measured with a spectrophotometer (UV-2450) manufactured by Shimadzu Corporation.

<Melting Characteristics>
(6) Melt Tension: MT

A melt tension MT (g) of a polycarbonate was measured with CAPILOGRAPH 1C manufactured by Toyo Seiki Seisaku-Sho, Ltd. at 280° C., an orifice diameter L/D of 8/2.095 mm, an extrusion speed of 10 mm/min, and a take-off speed of 3.1 m/min. A state in which a strand sagged owing to a low melt tension and hence could not be taken off with a roller was defined as a measurement lower limit. In addition, a state in which the strand solidified owing to a high melt tension and hence could not be taken off with the roller was defined as a measurement upper limit.

(7) Melt Flowability: MVR

A melt flowability MVR ($cm^3$/10 min) of a polycarbonate was measured with MFR METER UNIT E manufactured by Yasuda Seiki Seisakusho, Ltd. at 280° C. and a load of 2.16 kg.

Example 1

(1) Step of Synthesizing Polycarbonate Oligomer 2,000 ppm by mass of sodium dithionite with respect to bisphenol A (hereinafter sometimes abbreviated as "BPA") to be dissolved later was added to 5.6 mass % aqueous sodium hydroxide. After that, BPA was dissolved in the mixture so that a BPA concentration became 13.5 mass %. Thus, a solution of BPA in aqueous sodium hydroxide was prepared.

The solution of BPA in aqueous sodium hydroxide, dichloromethane, and phosgene were continuously passed through a tubular reactor having an inner diameter of 6 mm and a tube length of 30 m at 40 L/hr, 15 L/hr, and 4.0 kg/hr, respectively. The tubular reactor had a jacket portion, and cooling water was passed through the jacket to keep the reaction liquid at a temperature of 40° C. or less.

The reaction liquid that had exited the tubular reactor was continuously introduced into a baffled tank-type reactor including a sweptback blade and having an internal volume of 40 L, and then, 2.8 L/hr of the solution of bisphenol A in aqueous sodium hydroxide, 0.07 L/hr of 25 mass % aqueous sodium hydroxide, 17 L/hr of water, and 0.64 L/hr of a 1 mass % triethylamine aqueous solution were further added to the reactor to perform a reaction.

The reaction liquid overflown from the tank-type reactor was continuously taken out and left to stand still to separate and remove an aqueous phase, and a dichloromethane phase was then collected. The resultant polycarbonate oligomer had a concentration of 336 g/L and a chloroformate group concentration of 0.76 mol/L.

(2) Step of Polymerizing Polycarbonate 327 mL of the oligomer solution and 4.35 g of the branching agent (1) were loaded into a 1 L tank-type reactor including a baffle board and a paddle-type stirring blade, and it was confirmed that the branching agent (1) was dissolved. Next, 223 mL of dichloromethane and 207 µL of triethylamine (hereinafter abbreviated as "TEA") were added to the resultant, and then 6.4 mass % aqueous sodium hydroxide (obtained by dissolving 5.32 g of sodium hydroxide in 78 mL of water) was added to the mixture under stirring, followed by the performance of a polymerization reaction for 10 minutes.

Subsequently, a solution obtained by dissolving 3.76 g of p-tert-butylphenol (hereinafter abbreviated as "PTBP") in 10 mL of dichloromethane and a solution of BPA in aqueous sodium hydroxide (obtained by dissolving 50 mg of sodium dithionite and 21.49 g of BPA in an aqueous solution obtained by dissolving 12.9 g of sodium hydroxide in 189 mL of water) were added to the resultant, and a polymerization reaction was performed for 50 minutes.

200 mL of dichloromethane was added for diluting the resultant. After that, the diluted product was separated into an organic phase containing a polycarbonate, and an aqueous phase containing excessive amounts of BPA and sodium hydroxide, and the organic phase was isolated. The resultant dichloromethane solution of the polycarbonate was sequentially washed with 0.03 mol/L aqueous sodium hydroxide and 0.2 mol/L hydrochloric acid in amounts of 15 vol % each with respect to the solution. Next, the solution was repeatedly washed with pure water until an electric conductivity in an aqueous phase after the washing became 5 µS/cm or less. The dichloromethane solution of the polycarbonate obtained by the washing was concentrated and pulverized, and the resultant flake was dried under reduced pressure at 100° C. to provide a branched polycarbonate resin.

The viscosity-average molecular weight, branching agent content, solubility in dichloromethane, solubility in an oligomer/dichloromethane solution, thermal stability, melt tension, and melt flowability of the resultant polycarbonate measured by the above-mentioned methods are shown in Table 1.

Example 2

(2) Step of Polymerizing Polycarbonate 223 mL of the dichloromethane and 4.84 g of the branching agent (1) were loaded into a 1 L tank-type reactor including a baffle board and a paddle-type stirring blade, and it was confirmed that the branching agent (1) was dissolved. Next, 327 mL of an oligomer solution prepared in the same manner as in (1) of Example 1 and 207 µL of TEA were added to the resultant, and then 6.4 mass % aqueous sodium hydroxide (obtained by dissolving 5.32 g of sodium hydroxide in 78 mL of water) was added to the mixture under stirring, followed by the performance of a polymerization reaction for 10 minutes.

Subsequently, a solution obtained by dissolving 2.69 g of PTBP in 10 mL of dichloromethane and a solution of BPA in aqueous sodium hydroxide (obtained by dissolving 50 mg of sodium dithionite and 21.49 g of BPA in an aqueous solution obtained by dissolving 12.9 g of sodium hydroxide in 189 mL of water) were added to the resultant, and a polymerization reaction was performed for 50 minutes.

200 mL of dichloromethane was added for diluting the resultant. After that, the diluted product was separated into an organic phase containing a polycarbonate, and an aqueous phase containing excessive amounts of BPA and sodium hydroxide, and the organic phase was isolated. The resultant dichloromethane solution of the polycarbonate was sequentially washed with 0.03 mol/L aqueous sodium hydroxide and 0.2 mol/L hydrochloric acid in amounts of 15 vol % each with respect to the solution. Next, the solution was repeatedly washed with pure water until an electric conductivity in an aqueous phase after the washing became 5 µS/cm or less. The dichloromethane solution of the polycarbonate obtained by the washing was concentrated and pulverized, and the resultant flake was dried under reduced pressure at 100° C. to provide a polycarbonate.

The viscosity-average molecular weight, branching agent content, solubility in dichloromethane, solubility in an oligomer/dichloromethane solution, thermal stability, melt tension, and melt flowability of the resultant polycarbonate measured by the above-mentioned methods are shown in Table 1.

Comparative Example 1

(1) Step of Synthesizing Polycarbonate Oligomer 2,000 ppm by mass of sodium dithionite with respect to bisphenol A to be dissolved later was added to 5.6 mass % aqueous sodium hydroxide. After that, bisphenol A was dissolved in the mixture so that a bisphenol A concentration became 13.5 mass %. Thus, a solution of bisphenol A in aqueous sodium hydroxide was prepared.

The solution of bisphenol A in aqueous sodium hydroxide, dichloromethane, and phosgene were continuously passed through a tubular reactor having an inner diameter of 6 mm and a tube length of 30 m at 40 L/hr, 15 L/hr, and 4.0 kg/hr, respectively. The tubular reactor had a jacket portion, and cooling water was passed through the jacket to keep the reaction liquid at a temperature of 40° C. or less.

The reaction liquid that had exited the tubular reactor was continuously introduced into a baffled tank-type reactor including a sweptback blade and having an internal volume of 40 L, and then, 2.8 L/hr of the solution of bisphenol A in aqueous sodium hydroxide, 0.07 L/hr of 25 mass % aqueous sodium hydroxide, 17 L/hr of water, and 0.64 L/hr of a 1 mass % triethylamine aqueous solution were further added to the reactor to perform a reaction.

The reaction liquid overflown from the tank-type reactor was continuously taken out and left to stand still to separate and remove an aqueous phase, and a dichloromethane phase was then collected. The resultant polycarbonate oligomer had a concentration of 324 g/L and a chloroformate group concentration of 0.74 mol/L.

(2) Step of Polymerizing Polycarbonate 340 mL of the oligomer solution, 210 mL of dichloromethane, and 70 µL of TEA were loaded into a 1 L tank-type reactor including a baffle board and a paddle-type stirring blade, and a solution of 1,1,1-tris(4-hydroxyphenyl)ethane (THPE) (branching agent (4)) in aqueous sodium hydroxide (obtained by dissolving 2.38 g of THPE in an aqueous solution obtained by dissolving 2.44 g of sodium hydroxide in 36 mL of water) was added to the mixture under stirring, followed by the performance of a polymerization reaction for 10 minutes.

Subsequently, a solution obtained by dissolving 2.24 g of PTBP in 10 mL of dichloromethane and a solution of BPA in aqueous sodium hydroxide (obtained by dissolving 50 mg of sodium dithionite and 25.2 g of BPA in an aqueous solution obtained by dissolving 13.1 g of sodium hydroxide in 191 mL of water) were added to the resultant, and a polymerization reaction was performed for 50 minutes.

200 mL of dichloromethane was added for diluting the resultant. After that, the diluted product was separated into an organic phase containing a polycarbonate, and an aqueous phase containing excessive amounts of BPA and sodium hydroxide, and the organic phase was isolated. The resultant dichloromethane solution of the polycarbonate was sequentially washed with 0.03 mol/L aqueous sodium hydroxide and 0.2 mol/L hydrochloric acid in amounts of 15 vol % each with respect to the solution. Next, the solution was repeatedly washed with pure water until an electric conductivity in an aqueous phase after the washing became 5 µS/cm or less. The dichloromethane solution of the polycarbonate obtained by the washing was concentrated and pulverized, and the resultant flake was dried under reduced pressure at 100° C. to provide a polycarbonate.

The viscosity-average molecular weight, branching agent content, solubility in dichloromethane, solubility in an oligomer/dichloromethane solution, thermal stability, melt tension, and melt flowability of the resultant polycarbonate measured by the above-mentioned methods are shown in Table 1.

Examples 3 to 12 and Comparative Examples 12 to 14

The production of polycarbonates and their evaluations were performed in the same manner as in Example 1 except that in Example 1, the kind of the branching agent, the amount of the branching agent, and the amount of PTBP were each changed in accordance with Table 1.

Example 13 and Comparative Example 15

The production of polycarbonates and their evaluations were performed in the same manner as in Example 2 except that in Example 2, the kind of the branching agent, the amount of the branching agent, and the amount of PTBP were each changed in accordance with Table 1.

Comparative Examples 2 to 11

The production of polycarbonates and their evaluations were performed in the same manner as in Comparative Example 1 except that in Comparative Example 1, the kind of the branching agent, the amount of the branching agent, and the amount of PTBP were each changed in accordance with Table 1.

TABLE 1

| | | Primary structure | | | | | Thermal stability | Melting characteristics | |
| | | Amount of branching | Amount of | | Branching agent | Solubility | | Transmittance | | |
| | Branching agent | agent [g] | PTBP [g] | Mv | content [mol %] | Solubility-1 [g/100 g] | Solubility-2 [g/100 g] | of solution [%] | MT [g] | MVR [cm³/10 min] |
|---|---|---|---|---|---|---|---|---|---|---|
| Example 1 | Branching agent (1) | 4.35 | 3.76 | 18,500 | 0.9 | 0.77≤ | 0.52≤ | 98.0 | Measurement lower limit | 19.7 |
| Example 2 | Branching agent (1) | 4.84 | 2.69 | 34,300 | 1.0 | 0.77≤ | 0.52≤ | 98.0 | Measurement upper limit | 0.8 |
| Example 3 | Branching agent (1) | 2.45 | 2.69 | 18,500 | 0.6 | 0.77≤ | 0.52≤ | 98.9 | Measurement lower limit | 17.0 |
| Example 4 | Branching agent (1) | 2.25 | 3.09 | 15,400 | 0.5 | 0.77≤ | 0.52≤ | 98.7 | Measurement lower limit | 37.1 |
| Example 5 | Branching agent (1) | 4.35 | 3.09 | 24,400 | 0.9 | 0.77≤ | 0.52≤ | 98.0 | 13.9 | 3.1 |
| Example 6 | Branching agent (1) | 4.35 | 3.09 | 21,900 | 1.0 | 0.77≤ | 0.52≤ | 98.0 | 4.3 | 5.6 |
| Example 7 | Branching agent (1) | 2.23 | 2.38 | 18,700 | 0.5 | 0.77≤ | 0.52≤ | 98.6 | Measurement lower limit | 13.6 |
| Example 8 | Branching agent (1) | 8.35 | 5.24 | 27,100 | 1.9 | 0.77≤ | 0.52≤ | 97.0 | Measurement upper limit | 4.4 |
| Example 9 | Branching agent (1) | 4.97 | 3.38 | 21,900 | 1.2 | 0.77≤ | 0.52≤ | 98.0 | 3.2 | 8.0 |
| Example 10 | Branching agent (2) | 4.19 | 2.78 | 22,200 | 1.0 | 0.77≤ | 0.52≤ | 99.4 | 3.6 | 5.4 |
| Example 11 | Branching agent (2) | 4.19 | 2.69 | 23,000 | 1.0 | 0.77≤ | 0.52≤ | 99.5 | 5.1 | 4.4 |

TABLE 1-continued

| | | Amount of branching agent [g] | Amount of PTBP [g] | Primary structure Mv | Branching agent content [mol %] | Solubility Solubility-1 [g/100 g] | Solubility-2 [g/100 g] | Thermal stability Transmittance of solution [%] | Melting characteristics MT [g] | MVR [cm³/10 min] |
|---|---|---|---|---|---|---|---|---|---|---|
| | Branching agent | | | | | | | | | |
| Example 12 | Branching agent (2) | 4.19 | 2.88 | 21,600 | 1.0 | 0.77≤ | 0.52≤ | 99.8 | 2.4 | 6.8 |
| Example 13 | Branching agent (2) | 3.77 | 2.53 | 23,800 | 1.0 | 0.77≤ | 0.52≤ | 98.3 | 9.2 | 3.4 |
| Comparative Example 1 | Branching agent (4) | 2.38 | 2.24 | 20,300 | 1.0 | — | — | 96.0 | 2.0 | 3.9 |
| Comparative Example 2 | Branching agent (4) | 2.61 | 2.88 | 20,000 | 1.5 | — | — | 91.0 | 9.5 | 2.6 |
| Comparative Example 3 | Branching agent (4) | 2.23 | 2.24 | 19,400 | 0.9 | — | — | — | 1.3 | 6.4 |
| Comparative Example 4 | Branching agent (4) | 2.23 | 1.91 | 22,500 | 1.0 | — | — | — | 8.8 | 1.7 |
| Comparative Example 5 | Branching agent (4) | 2.23 | 2.07 | 20,900 | 0.9 | — | — | — | 2.7 | 3.6 |
| Comparative Example 6 | Branching agent (4) | 2.38 | 2.01 | 23,400 | 1.1 | — | — | — | 7.0 | 1.7 |
| Comparative Example 7 | Branching agent (5) | 3.30 | 3.43 | 21,600 | 0.9 | <0.0024 | <0.0015 | 71.7 | 13.1 | 4.0 |
| Comparative Example 8 | Branching agent (5) | 1.47 | 2.24 | 21,100 | 0.4 | <0.0024 | <0.0015 | — | 1.6 | 6.0 |
| Comparative Example 9 | Branching agent (5) | 1.93 | 2.69 | 22,400 | 0.7 | <0.0024 | <0.0015 | — | 4.8 | 4.2 |
| Comparative Example 10 | Branching agent (5) | 1.64 | 2.24 | 23,400 | 0.5 | <0.0024 | <0.0015 | 95.5 | 6.8 | 3.5 |
| Comparative Example 11 | Branching agent (6) | 1.30 | 3.33 | 21,500 | 0.9 | — | — | 95.8 | 3.8 | 5.2 |
| Comparative Example 12 | Branching agent (3) | 5.40 | 3.16 | 22,000 | 1.1 | 0.77≤ | 0.52≤ | 91.8 | 5.7 | 8.1 |
| Comparative Example 13 | Branching agent (3) | 5.33 | 3.49 | 18,300 | 1.1 | 0.77≤ | 0.52≤ | — | Measurement lower limit | 19.1 |
| Comparative Example 14 | Branching agent (3) | 5.40 | 2.88 | 25,500 | 1.1 | 0.77≤ | 0.52≤ | — | 19.7 | 3.8 |
| Comparative Example 15 | Branching agent (3) | 5.40 | 3.16 | 24,300 | 1.0 | 0.77≤ | 0.52≤ | — | 11.5 | 4.6 |

In Tables 1-1 and 1-2, the branching agents (1), (2), (3), (4), (5), and (6) are the following compounds, respectively.

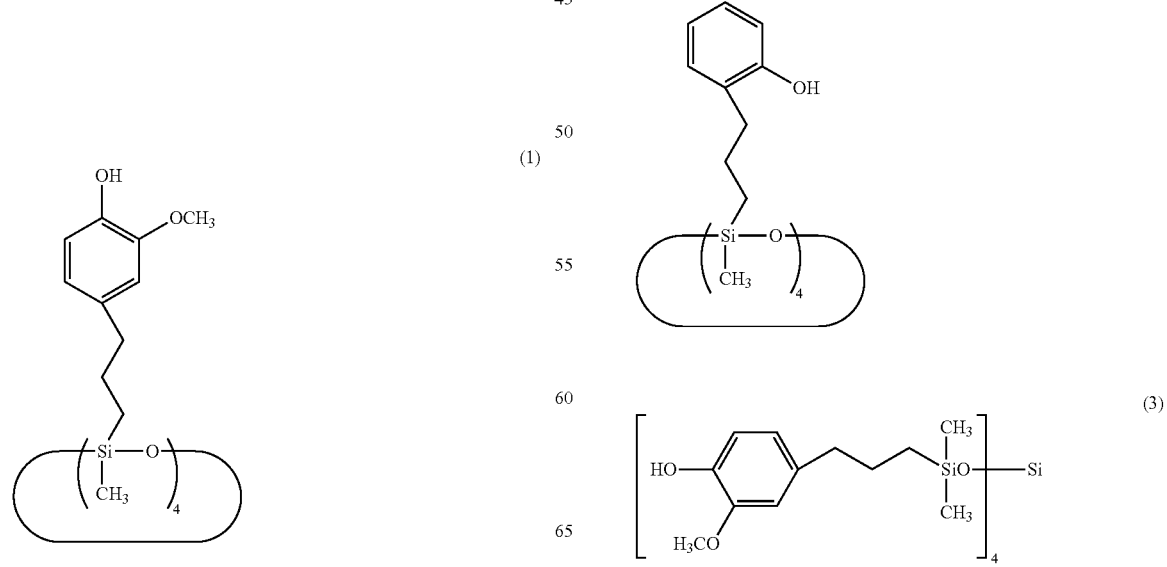

-continued

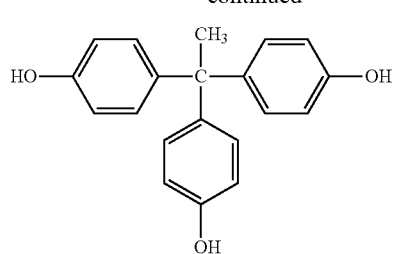

1,1,1-Tris(4-hydroxyphenyl)ethane (Tribranched)

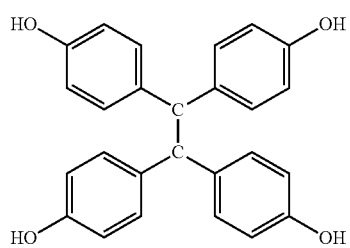

1,1,2,2-Tetrakis(4-hydroxyphenyl)ethane
(Tetrabranched)

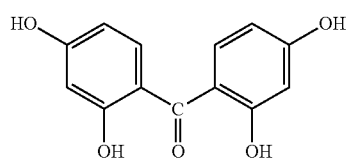

2,2',4,4'-Tetrahydroxybenzophenone (Tetrabranched)

In addition, in the column "Solubility-1", the solubility of a branching agent in dichloromethane is shown, and in the column "Solubility-2", the solubility of a branching agent in a dichloromethane solution of a polycarbonate oligomer is shown.

As is apparent from the tables, the branched polycarbonate resin of the present invention shows excellent solubility in dichloromethane serving as one kind of solvent to be used as a solvent at the time of its production. In addition, the branched polycarbonate resin of the present invention shows high thermal stability, and at the same time, has excellent melting characteristics.

INDUSTRIAL APPLICABILITY

The branched polycarbonate resin of the present invention is suitable for, for example, blow molding because the resin has a high melt tension.

A molded article containing the branched polycarbonate resin of the present invention is suitable for various industrial applications, such as a lighting cover, a lens, a water bottle, a protective cover for a display, OA equipment, and electrical and electronic fields.

The invention claimed is:

1. A branched polycarbonate resin, comprising a constituent unit represented by the general formula (I'):

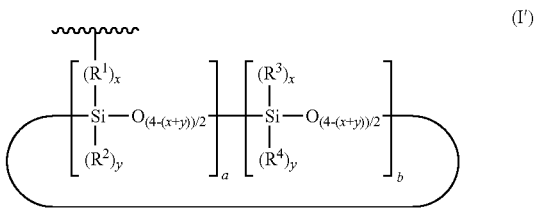

wherein $R^1$ represents —O-A-R—, A represents an arylene group having 6 to 12 carbon atoms, R represents an alkylene group having 1 to 6 carbon atoms, R is bonded to a Si atom, A may further have a substituent, and a plurality of $R^1$'s may be identical to or different from each other, $R^2$, $R^3$, and $R^4$ each independently represent an alkyl group having 1 to 6 carbon atoms, a phenyl group, and/or a trimethylsiloxy group, and a plurality of $R^2$'s, a plurality of $R^3$'s, or a plurality of $R^4$'s may be identical to or different from each other, x represents a number of 1 or more and less than 2, y represents a number of 0 or more and 1 or less, and x+y is 1 or more and 2 or less, and a represents a number of 4 or more and 16 or less, and b represents a number of 0 or more and 8 or less.

2. The branched polycarbonate resin according to claim 1, wherein the constituent unit represented by the general formula (I') has a structure derived from a silsesquioxane.

3. The branched polycarbonate resin according to claim 1, wherein a in the constituent unit represented by the general formula (I') represents 4 or more and 8 or less, and b therein represents 0.

4. The branched polycarbonate resin according to claim 1, wherein the constituent unit represented by the general formula (I') has a structure represented by the general formula (II') and/or the general formula (III'):

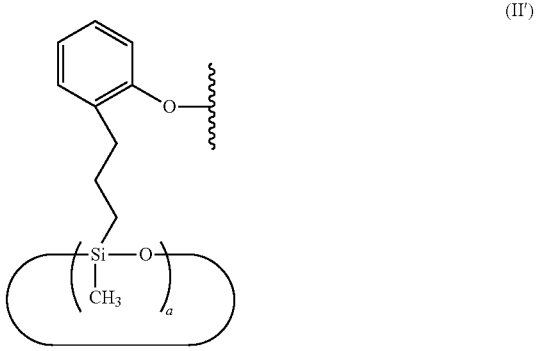

formula (I) has a structure represented by the general formula (II) and/or the general formula (III):

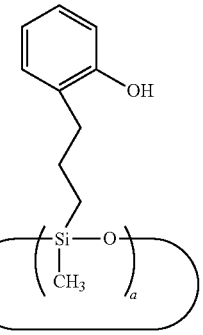

(II)

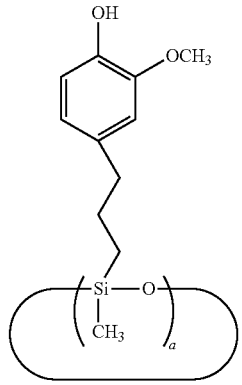

(III)

wherein a represents an integer of 4 or more and 16 or less.

12. The branched polycarbonate resin according to claim 11, wherein a in the structure represented by the general formula (II) and/or the general formula (III) represents 4 or more and 8 or less.

13. The branched polycarbonate resin according to claim 8, wherein the branching agent represented by the general formula (I) is soluble in dichloromethane.

14. The branched polycarbonate resin according to claim 13, wherein the branching agent represented by the general formula (I) has a solubility in 100 g of dichloromethane of 0.0024 g or more.

15. The branched polycarbonate resin according to claim 8, wherein the branching agent represented by the general formula (I) is soluble in a dichloromethane solution of a polycarbonate oligomer.

16. The branched polycarbonate resin according to claim 15, wherein the branching agent represented by the general formula (I) has a solubility in 100 g of a dichloromethane solution of a polycarbonate oligomer of 0.0015 g or more.

17. A polycarbonate resin composition, comprising:
the branched polycarbonate resin (A-1) of claim 1; and
a thermoplastic resin (A-2) except the (A-1).

18. A method of producing the branched polycarbonate resin of claim 1, comprising producing the resin through use of a dihydric phenol, a branching agent represented by the following general formula (I), an end terminator, and phosgene according to an interfacial polymerization method:

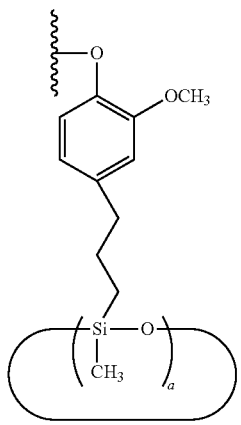

(III')

wherein a represents an integer of 4 or more and 16 or less.

5. The branched polycarbonate resin according to claim 4, wherein a in the structure represented by the general formula (II') and/or the general formula (III') represents 4 or more and 8 or less.

6. The branched polycarbonate resin according to claim 1, wherein a content of the constituent unit represented by the general formula (I') is from 0.1 mol % to 4.0 mol %.

7. The branched polycarbonate resin according to claim 1, wherein the resin has a viscosity-average molecular weight Mv of from 12,000 to 70,000.

8. The branched polycarbonate resin according to claim 1, wherein the constituent unit represented by the general formula (I') is derived from a branching agent represented by the general formula (I):

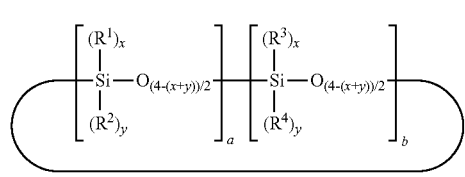

(I)

wherein $R^1$ represents HO-A-R—, A represents an arylene group having 6 to 12 carbon atoms, R represents an alkylene group having 1 to 6 carbon atoms, R is bonded to a Si atom, A may further have a substituent, and a plurality of $R^1$'s may be identical to or different from each other, $R^2$, $R^3$, and $R^4$ each independently represent an alkyl group having 1 to 6 carbon atoms, a phenyl group, and/or a trimethylsiloxy group, and a plurality of $R^2$'s, a plurality of $R^3$'s, or a plurality of $R^4$'s may be identical to or different from each other, x represents a number of 1 or more and less than 2, y represents a number of 0 or more and 1 or less, and x+y is 1 or more and 2 or less, and a represents a number of 4 or more and 16 or less, and b represents a number of 0 or more and 8 or less.

9. The branched polycarbonate resin according to claim 8, wherein the branching agent has a silsesquioxane skeleton.

10. The branched polycarbonate resin according to claim 8, wherein a in the general formula (I) represents 4 or more and 8 or less, and b therein represents 0.

11. The branched polycarbonate resin according to claim 8, wherein the branching agent represented by the general

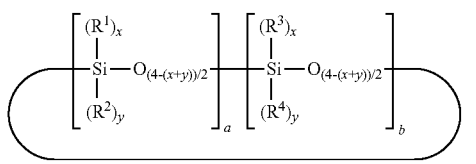

wherein $R^1$ represents HO-A-R—, A represents an arylene group having 6 to 12 carbon atoms, R represents an alkylene group having 1 to 6 carbon atoms, R is bonded to a Si atom, A may further have a substituent, and a plurality of $R^1$'s may be identical to or different from each other, $R^2$, $R^3$, and $R^4$ each independently represent an alkyl group having 1 to 6 carbon atoms, a phenyl group, and/or a trimethylsiloxy group, and a plurality of $R^2$'s, a plurality of $R^3$'s, or a plurality of $R^4$'s may be identical to or different from each other, x represents a number of 1 or more and less than 2, y represents a number of 0 or more and 1 or less, and x+y is 1 or more and 2 or less, and a represents a number of 4 or more and 16 or less, and b represents a number of 0 or more and 8 or less.

19. The method of producing the branched polycarbonate resin according to claim 18,
wherein the method comprises:
a step (1) of causing the dihydric phenol and phosgene to react with each other to produce a polycarbonate oligomer; and
a step (2) of causing the polycarbonate oligomer, the dihydric phenol, and the end terminator to react with each other to produce the polycarbonate resin, and
wherein the branching agent is added to the step (1) and/or the step (2).

20. The method of producing the branched polycarbonate resin according to claim 19, wherein when the branching agent is added to the step (2), the step (2) is performed after the polycarbonate oligomer obtained in the step (1) and the branching agent have been polymerized in advance.

* * * * *